INVENTORS
Robert E. Belfield
Arthur C. Vogel
BY
ATTORNEYS

INVENTORS
Robert E. Belfield
Arthur C. Nagel
BY
ATTORNEYS

INVENTORS
Robert E. Belfield
Arthur C. Vogel
BY Synnestvedt & Lechner
ATTORNEYS

United States Patent Office 3,444,028
Patented May 13, 1969

3,444,028
EQUIPMENT FOR USE IN LAYING DOWN GLASS FIBER BLANKET
Robert E. Belfield, East Islip, and Arthur C. Vogel, Glen Cove, N.Y., assignors to Certain-Teed Saint Gobain Insulation Corporation, Ardmore, Pa., a corporation of Maryland
Continuation of abandoned application Ser. No. 183,301, Mar. 28, 1962. This application Oct. 1, 1964, Ser. No. 400,853
Int. Cl. B29j *1/00;* B65g *45/00*
U.S. Cl. 156—371                                                      10 Claims

ABSTRACT OF THE DISCLOSURE

Conveyor for use in collecting glass fibers to which a heat hardenable liquid resin binder has been applied. An endless conveyor is comprised of pivotally interconnected flights, each formed of a plurality of supporting bars arranged in spaced apart, side-by-side relationship. The spaces between the bars provide open channels extending throughout the conveyor loop and through which gases can pass. One end of each bar is beveled and the axes of pivotal interconnection between adjacent flights lie substantially in the plane of the fiber supporting surfaces of the bars, so that the fiber supporting surface is uninterrupted in the direction of conveyor travel. Toothed elements project into the open channels in the return run of the conveyor in order to dislodge any accummulations of resin and fiber glass from the flights.

---

The present application continues my prior application Ser. No. 183,301, filed Mar. 28, 1962, now abandoned.

This invention relates to the production of glass fiber products and is especially concerned with equipment for use in laying down a mat or blanket of glass fibers, particularly where a heat hardenable liquid resin binder has been applied to the fibers.

In an operation of the kind here involved, the glass fibers are produced by attenuation of streams of molten glass under the influence of a hot gaseous blast, and the attenuated fibers are deposited or laid down upon a moving surface of a conveyor. In a typical operation of this kind a liquid binder, for instance a heat settable liquid resin is sprayed upon the fibers before they are laid down upon the conveyor, and subsequent to the laydown the blanket developed on the conveyor is transported to an oven in which it is subjected to heat so as to set the adhesive and thereby bond the fibers together and consolidate the formed blanket.

Although operations of this general kind have been in use, considerable difficulty has been encountered in connection with the conveyor arrangement on which the blanket is laid down.

It is advantageous that such conveyors be provided with apertures therethrough so that the attenuating gases may pass through the conveyor while depositing the fibers on the supporting surface of the conveyor, this action sometimes being enhanced by the provision of suction means behind the area of the conveyor on which the blanket is laid down. It may also be mentioned that a conveyor of this type is advantageously made of metal parts linked or pivoted to each other in a closed circuit, in a typical case the conveyor having two generally horizontal runs, on the upper of which the fiber blanket is laid down.

Apertured or foraminous conveyors used in the general manner described above are subject to serious clogging tendencies due to the accumulation of glass and glass fibers in the apertures of the conveyor, this problem being aggravated by the presence of a heat settable binder on the fibers which adheres and tends to accumulate and solidify on the conveyor.

In consequence of such clogging, the flow of gases through the apertures of the conveyor is impaired and this tends to produce a fiber blanket of nonuniform thickness. The clogging of the apertures and the adherence of excessive quantities of glass and/or binder to the conveyor will at times damage the conveyor structure or its drive mechanism. In view of various of the difficulties encountered, it has heretofore been necessary to stop the conveyor and subject it to a cleaning operation. This has been required at relatively frequent intervals thereby impairing the desired continuous operation of the equipment, which is particularly important in the production of products made from glass, and especially when employing glass fiber attenuation means which is cumbersome and troublesome to repeatedly start and stop.

With all of the foregoing in mind the present invention has as its major objective the provision of conveyor equipment adapted for the laydown of glass fiber blankets, which equipment is adapted for long continued use without shutdown.

More specifically, the invention contemplates conveyor equipment adapted for use in the laydown of fiber blankets in which means are provided for automatically and continuously cleaning the conveyor while the equipment is in use.

How the foregoing and other objects and advantages are attained will appear more fully from the following description referring to the accompanying drawings illustrating a preferred embodiment of the invention and in which.

Figure 1:
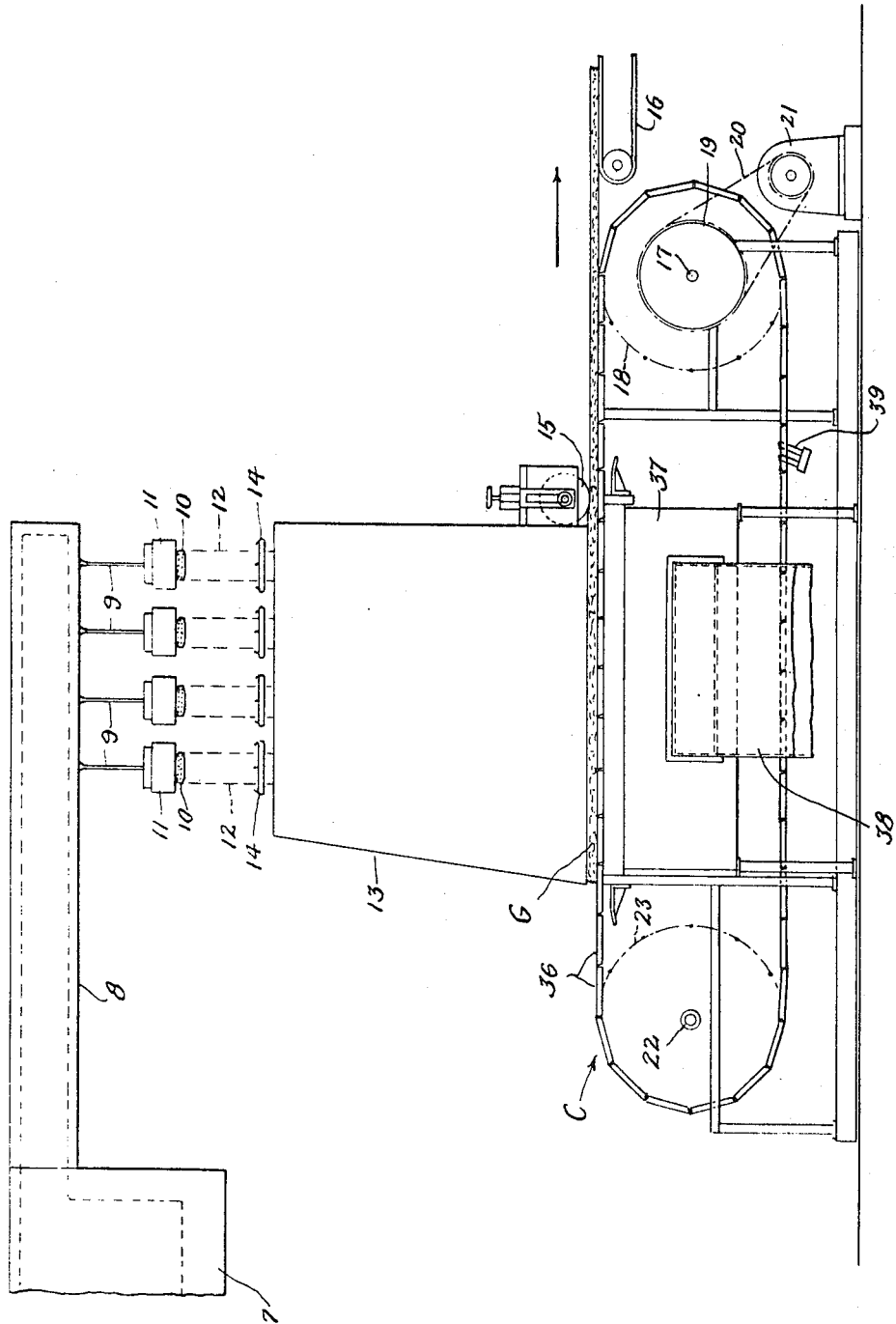
FIGURE 1 is a somewhat diagrammatic elevational view of a glass fiber producing equipment arranged to lay down a blanket of fibers upon a conveyor constructed and operating in accordance with the present invention.
Figure 2:
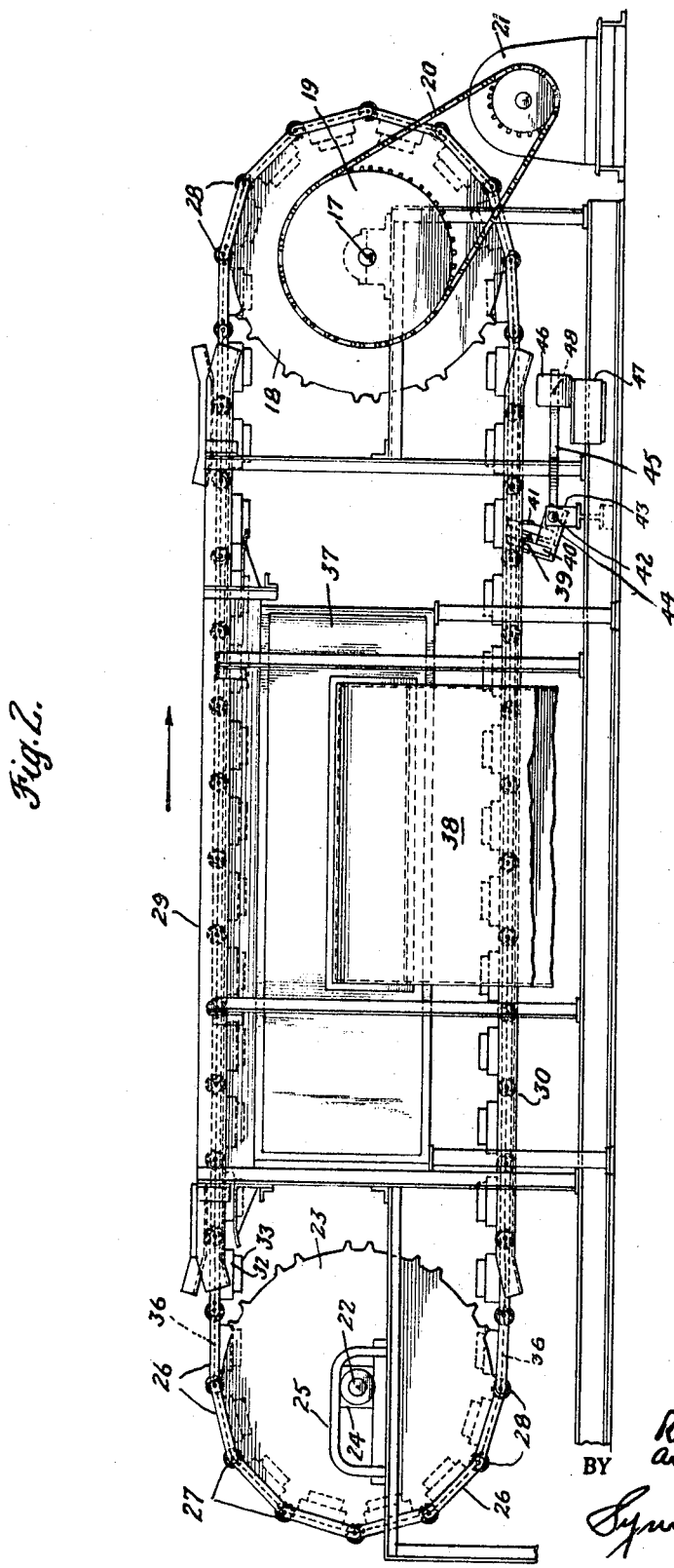
FIGURE 2 is an enlarged elevational view of the conveyor equipment shown in FIGURE 1.

Referring first to FIGURE 1, there is diagrammatically indicated at 7 a portion of a glass furnace having a forehearth 8 from which streams of molten glass 9 are delivered into spinners or rotors 10 adapted to rotate about vertical axes and having a multiplicity of apertures or orifices through which fine streams of glass are discharged radially. Associated with each spinner 10 is a gas blast mechanism 11 indicated in outline, this gas blast mechanism having an annular discharge orifice adjacent the periphery of the spinner and directed downwardly, so that a cylindrical curtain of fibers is formed by attenuation of the streams of glass issuing from the spinner. Such cylindrical curtains are indicated at 12 in FIGURE 1 and these are shown as descending downwardly into the open top of a forming hood 13 which overlies the conveyor mechanism to be described more fully herebelow. In the downward path of the glass fibers a liquid heat settable binder is applied to the fibers, advantageously by means of spray nozzles directed inwardly from the supply rings 14. The hood 13 is in the nature of a box having four side walls but being open at both top and bottom, the lower opening being presented close to the upper surface of the conveyor generally indicated at C in FIGURE 1 and shown in greater detail in other figures to be described. In accordance with the foregoing technique a blanket of glass fibers indicated at G is laid upon the top run of the conveyor and is carried away in the direction indicated by the arrow in FIGURE 1. At the exit side of the hood 13, a sealing roll 15 may be employed, as an aid to maintaining the blanket in desired uniform condition as it leaves the area under the hood 13. A secondary conveyor 16 may be utilized to carry the formed blanket away from the conveyor C to a point for further treatment or use, for instance into an oven for heating the blanket and thus curing the binder and thereby consolidating the fibers of the blanket.

Referring now more particularly to FIGURES 2 to 6 inclusive, the arrangement of the conveyor is as follows:

A sprocket shaft 17 is provided toward one end of the conveyor, this shaft carrying a pair of sprockets 18, one toward each end of the shaft, i.e., one toward each side of the conveyor. The shaft 17 is adapted to be driven by a sprocket 19 cooperating with a chain 20 which receives power from a suitable motor, desirably through a gear reduction unit 21. Toward the opposite end of the equipment a shaft 22 is provided and this shaft carries a pair of spaced sprockets 23 one toward each side of the conveyor, and the shaft 22 is desirably provided with adjustable-bearing blocks such as indicated at 24 movable in a slotted support 25 to provide for slack takeup and compensation for wear of the conveyor elements.

The conveyor itself includes pairs of links 26 pivotally connected in two series, one paired series being located at each side of the conveyor and the interconnection pivots which are indicated at 27 carrying rollers 28 which are adapted to be engaged by the teeth on both the driving and idling sprockets 18 and 23 and which are further adapted to ride upon tracks 29 located at the edges of the upper run of the conveyor and still further upon tracks 30 located along the edges of the lower run of the conveyor. These tracks may conveniently comprise simple angle pieces such as indicated in section in FIGURE 3.

Figure 3:
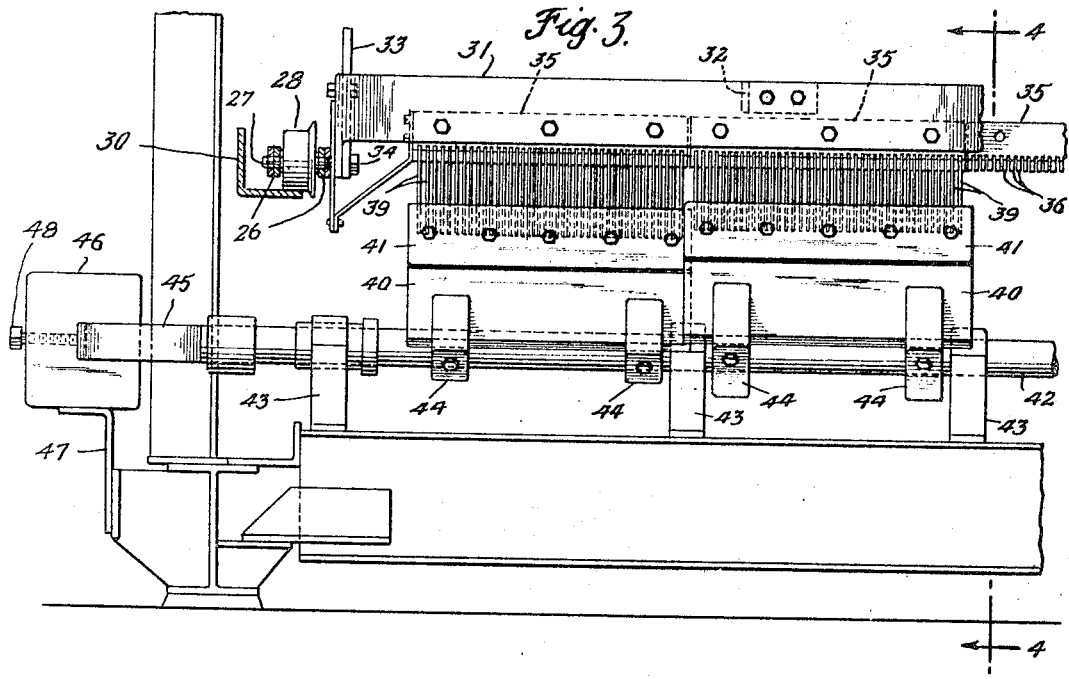
FIGURE 3 is a further enlarged transverse sectional view of a portion of the lower run of the conveyor equipment shown in FIGURES 1 and 2, this view being taken as indicated by the line 3—3 on FIGURE 4.
Figure 4:
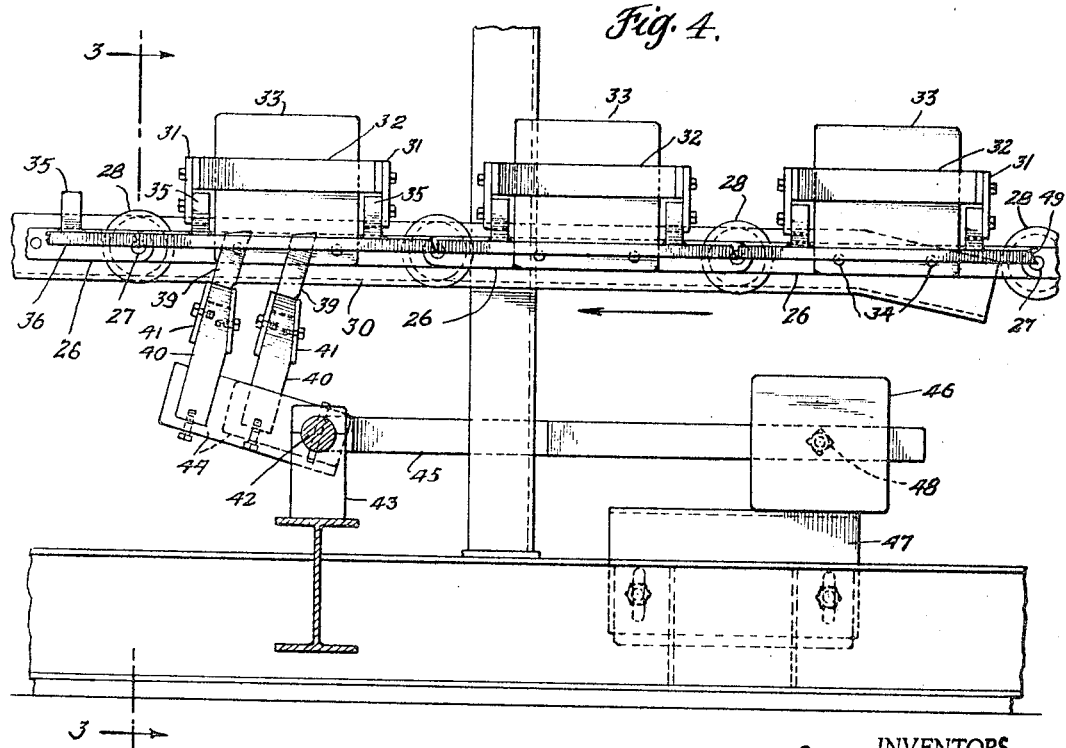
FIGURE 4 is a view taken generally as indicated by the line 4—4 on FIGURE 3.
Figure 5:
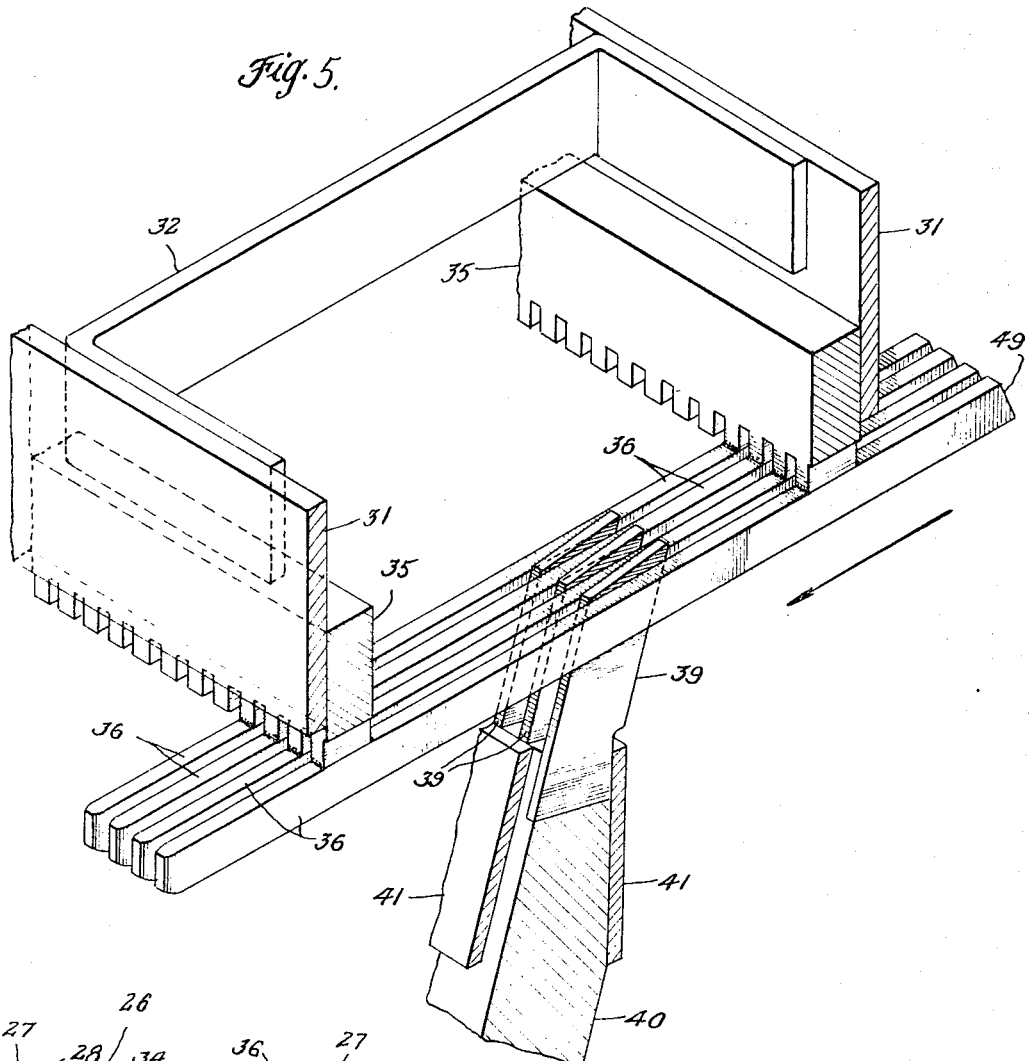
FIGURE 5 is a fragmentary isometric view illustrating the relative arrangement of certain elements of the conveyor and certain of the cleaning elements employed.

The pairs of links 26 at each side of the conveyor are interconnected by transverse structural members 31, there being a pair of these members for the paired links at each side, the members 31 having interconnecting cross braces 32 (see particularly FIGURES 4 and 5). The cross braces in turn are fastened by brackets or plates 33 which are bolted or otherwise secured to the conveyor or chain links as indicated at 34 in FIGURES 3, 4 and 6.

Each of the transverse members 31 (see particularly FIGURES 4 and 5) serves to carry a notched support 35 to which a series of bars 36 are welded, in the manner shown in FIGURES 3, 4 and 5.

In accordance with the foregoing, pivotally interconnected conveyor flights are provided, each flight being built or made up of the parts including pairs of conveyor links 26 at opposite sides of the conveyor, transverse elements 31 with their interconnecting parts 32, the supporting members 35 and the bars 36. The bars 36 provide the fiber supporting surface of the conveyor and these bars, as clearly seen in FIGURES 3 and 5, are closely spaced transversely of the conveyor. The pairs are further arranged in alignment with each other in series around the conveyor loop, so that the spaces between adjacent series of bars provide open channels extended throughout the conveyor loop. The inter bar spaces provides for flow of gases through the blanket supporting surface of the conveyor during laydown of the fibers to form the blanket, and provision is made (see FIGURES 1 and 2) for enhancing this action by applying suction to the underside of the top run of the conveyor, for which purpose a suction box 37 is arranged between the upper and lower runs of the conveyor, preferably having an opening adjacent the underside of the upper run and having one or more off-takes 38 at the side of the conveyor through which the suction box 37 may be connected with a vacuum system.

During operation of the equipment, as described above, the fiber blanket G is laid down upon the upper surface of the upper run of the conveyor bars 36 and glass fibers and binder tend to accumulate in the spaces between the bars. However, in accordance with the present invention provision is made in a region of the conveyor spaced from the region where the blanket is laid down to automatically and continuously clean out the spaces between the bars 36. For this purpose groups of scraper blades or knives such as indicated at 39 are employed. These are mounted in groups by means of supporting bars 40, removable fastening plates 41 being provided in order to facilitate replacement of the scrapers.

As seen in various of the figures, the scrapers 39 project upwardly entirely through the spaces between the adjacent bars 36, the notches in the support members 35 providing the necessary clearance for this. Advantageously the scrapers 39 are individually of width just slightly less than the spacing between adjacent bars 36, so as to provide for effective clean-out of the spaces or channels between the bars around the loop of the conveyor.

The supporting bars 40 for the scraper blades are pivotally carried by a shaft 42 having spaced bearing supports 43, brackets 44 serving to mount the bars 40 on the shaft 42. Also secured to the shaft 42 are arms 45, preferably one at each side of the equipment and each carrying a weight acting about the axis of shaft 42 to maintain the scraper blades 39 in their upper or scraping position in which they are interleaved or interdigitated with the conveyor bars 36.

With the scrapers 39 mounted for displacement movement about the axis of the shaft 42 and with the conveyor moving in the direction as indicated in various of the figures, in the event that the scraper bars encounter some obstruction which is unusually difficult to remove, the scrapers are automatically displaced from their normal scraping position in order to pass such an obstruction and in that way avoid breakage either of the scrapers or of the conveyor structure.

The height at which the scrapers are positioned under the influence of the weights 46 may be regulated by the vertically adjustable stops 47. In addition the effect of the weight on the scrapers may also be regulated by shifting the weights 46 along the arms 45, fastening studs such as shown at 48 being provided in order to secure the weights in any adjusted position.

Figure 6:
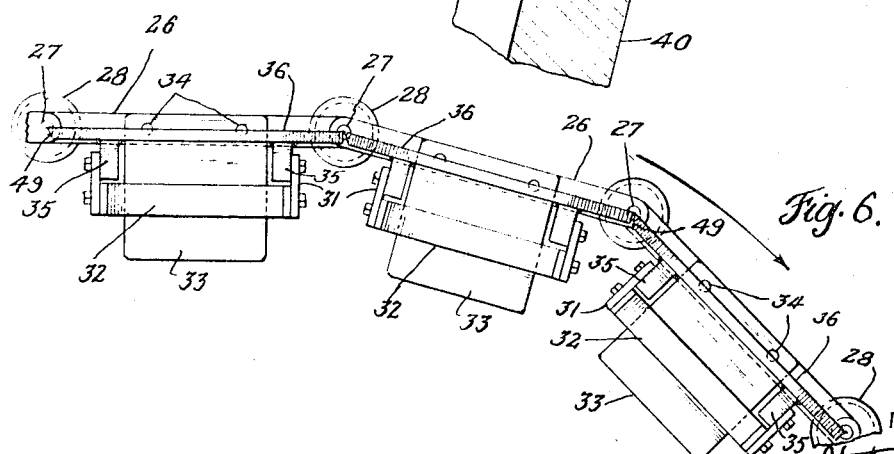
FIGURE 6 is a fragmentary elevational view of a portion of the conveyor as the conveyor is moving from the upper horizontal run into a curved run at one end of the conveyor.

Attention is further called to the fact that the axis of the link pivots 27 lie in the plane of the supporting surfaces of the conveyor bars 36. Because of this (see FIGURE 6) as the conveyor bars progress from the horizontal top run of the conveyor into the curved path around the driving sprocket, no appreciable opening or space is developed between the adjacent ends of the conveyor bars of adjacent flights of the conveyor. At least one end of the conveyor bars is preferably cut away at an incline as indicated in FIGURES 5 and 6 at 49 in order to accommodate relative angling of the bars as they move in the curved path around either the driving or the idling sprockets. This feature is advantageous as it avoids opening up of additional spaces or cavities between adjacent ends of the supporting bars of the conveyor which might have a tendency to accept glass, binder or other foreign material and cause difficulty when the flights again pass from a curved run back into a straight run of the conveyor.

The arrangement of the scraper blades in the lower run of the conveyor is particularly advantageous because of the fact that all of the materials which are dislodged readily fall by gravity away from the conveyor. The scraper blades are highly effective in continuously cleaning the conveyor, so that shutdowns are virtually eliminated. In addition the arrangement provides for maintenance of a much higher degree of uniformity of the fiber blanket produced, because the gas flow area through the blanket supporting surface remains uniformly open.

I claim:

1. Apparatus for making a binder impregnated glass fiber blanket comprising in combination with a fiber spinning device having a gaseous blast fiber-attenuation means adapted to deliver a stream of fibers downwardly and with means for impregnating the fibers with a liquid heat settable binder, a conveyor for receiving the stream of fibers laid down by said blast and for supporting the spun and impregnated fibers in the form of a blanket, the conveyor comprising an endless loop of interconnected conveyor flights or links each of which comprises a plurality of blanket supporting elements elongated in the direction of movement of the conveyor and arranged in spaced side-by-side relation with the spaces between the elements of the several flights aligned with each other to provide open channels extended throughout the conveyor loop, the conveyor loop having an upper run on the upper side of which the fiber blanket is laid down and a lower or return run, and the spaces between the elements in the upper run providing communication through that run to the region between the upper and lower runs and thereby for passage of gas of said blast through the upper run of the conveyor while depositing the impregnated fibers on the supporting elements, and toothed elements below the lower run of the conveyor projecting upwardly into said open channels, the toothed elements being of width not appreciably less than that of the spaces between the blanket supporting elements and being mounted and positioned to engage and dislodge glass and binder from said open channels including the spaces between the blanket supporting elements.

2. Apparatus according to claim 1 in which the toothed elements comprise stationary blades.

3. Apparatus for making a binder impregnated glass fiber blanket comprising in combination with a fiber spinning device having a gaseous blast fiber-attenuation means adapted to deliver fibers downwardly and with means for impregnating the stream of fibers with a liquid heat settable binder, a conveyor for receiving the stream of fibers laid down by said blast and for supporting the spun and impregnated fibers in the form of a blanket, the conveyor comprising an endless loop of interconnected conveyor flights or links each of which comprises a plurality of blanket supporting elements elongated in the direction of movement of the conveyor and arranged in spaced side-by-side relation with the spaces between the elements of the several flights aligned with each other to provide open channels extended throughout the conveyor loop, the conveyor loop having an upper run on the upper side of which the fiber blanket is laid down and a lower or return run, and the spaces between the elements in the upper run providing communication through that run to the region between the upper and lower runs and thereby for passage of gas of said blast through the upper run of the conveyor while depositing the impregnated fibers on the supporting elements, and toothed elements arranged outside of the conveyor loop in a region beyond that in which the fibers are laid down and projecting into said open channels, the toothed elements being mounted and positioned to engage and dislodge glass and binder from said open channels including the spaces between the blanket supporting elements.

4. Apparatus for making a glass fiber blanket comprising in combination with a fiber spinning device having a gaseous blast fiber-attenuation means adapted to establish a stream of fibers, a conveyor for receiving the stream of fibers established by said blast and providing for buildup of the fibers in the form of a blanket, the conveyor comprising an endless loop of interconnected conveyor flights or links each of which comprises a plurality of blanket supporting elements elongated in the direction of movement of the conveyor and arranged in spaced side-by-side relation with the spaces between the elements of the several flights aligned with each other to provide open channels extended throughout the conveyor loop, the conveyor loop having a first run positioned to receive the stream of fibers during buildup of the blanket and a second or return run, and the spaces between the elements in the first run providing communication through that run to the region between said runs and thereby for passage of gas of said blast through the first run of the conveyor while depositing the impregnated fibers on the supporting elements, and toothed elements positioned at the outside of the second run of the conveyor projecting inwardly into said open channels, the toothed elements being of width not appreciably less than that of the spaces between the blanket supporting elements and being mounted and positioned to engage and dislodge foreign matter from said open channels including the spaces between the blanket supporting elements.

5. Apparatus according to claim 4 and further including a gas chamber between the runs of the conveyor having an inlet opening for receiving gas passing through the spaces between the blanket supporting elements in the region where the blanket is built up and having an outlet for conducting the gas away from the conveyor.

6. Apparatus according to claim 4 and further including suction means for assisting passage of gas through the spaces betwen the blanket supporting elements in the region of the upper run of the conveyor where the blanket is built up.

7. Apparatus for making a glass fiber blanket comprising in combination with a fiber spinning device having a gaseous blast fiber-attenuation means adapted to establish a stream of fibers, a conveyor for receiving the stream of fibers established by said blast and providing for buildup of the fibers in the form of a blanket the conveyor comprising an endeles loop of pivotally interconnected conveyor flights or links each of which comprises a plurality of blanket supporting elements elongated in the direction of movement of the conveyor and arranged in spaced side-by-side relation with the spaces between the elements of the several flights aligned with each other to provide open channels extended throughout the conveyor loop, the conveyor loop having a first run positioned to receive the stream of fibers during buildup of the blanket and a second or return run with interconnecting curved portions between the first and second runs, the axes of the pivotal interconnections between the conveyor links lying substantially in the plane of the fiber supporting surfaces of said supporting elements and in positions substantially at the adjacent ends of the elements of the several conveyor links to thereby cause said ends of the supporting elements to remain adjacent each other as they pivot relative to each other when passing through said curved portions of the conveyor loop, and the spaces between the elements in the first run providing communication through that run to the region between the runs and thereby for passage of gas of said blast through the first run of the conveyor while depositing the impregnated fibers on the supporting elements, and toothed elements projecting into said open channels to dislodge foreign matter therefrom.

8. Apparatus for making a glass fiber blanket comprising in combination with a fiber spinning device having a gaseous blast fiber-attenuation means adapted to establish a stream of fibers, a conveyor for receiving the stream of fibers established by said blast and providing buildup of the fibers in the form of a blanket, the conveyor comprising an endless loop of interconnected conveyor flights or links each of which comprises a plurality of blanket supporting elements elongated in the direction of movement of the conveyor and arranged in spaced side-by-side relation with the spaces between the elements of the several flights aligned with each other to provide open channels extended throughout the conveyor loop, the conveyor loop having a first run positioned to receive the stream of fibers during buildup of the blanket and a second or return run, and the spaces between the elements in the upper run providing communication through that run to the region between said runs and thereby for passage of gas of said blast through the first run of the conveyor while depositing the impregnated fibers on the supporting elements, toothed elements arranged outside of the conveyor loop in a region beyond that in which the fibers are laid down and projecting into said open channels to dislodge foreign matter therefrom, and means mounting the toothed elements for yielding displacement out of said channels under the influence of the foreign matter difficult to dislodge.

9. Apparatus according to claim 8 in which the toothed elements are pivotally mounted for displacement out of said channels, the equipment further including yielding means acting about the pivot axis to retain the toothed elements in said open channels.

10. Apparatus according to claim 9 in which toothed elements are pivotally mounted about a horizontal pivot axis and in which the yielding means comprises a weight connected with the toothed elements and offset from the pivot axis to act by gravity to retain the toothed elements in said open channels.

References Cited
UNITED STATES PATENTS

| | | | |
|---|---|---|---|
| 1,146,282 | 7/1915 | Rogers | 198—229 |
| 2,060,491 | 11/1936 | Dunlop | 198—229 |
| 2,681,137 | 6/1954 | Davis | 198—230 |
| 3,073,430 | 1/1963 | Quinn | 198—229 |
| 3,144,376 | 8/1964 | Plumberg et al. | 156—374 |

EARL M. BERGERT, *Primary Examiner.*

W. E. HOAG, *Assistant Examiner.*

U.S. Cl. X.R.

156—377; 198—195, 229